Patented Sept. 19, 1922.

1,429,781

UNITED STATES PATENT OFFICE.

HUGO SCHWEITZER, OF LEVERKUSEN, NEAR COLOGNE, GERMANY, ASSIGNOR TO FARBENFABRIKEN VORM. FRIEDR. BAYER AND CO., OF LEVERKUSEN, NEAR COLOGNE-ON-THE-RHINE, GERMANY.

BLUE WOOL DYESTUFF.

No Drawing.   Application filed August 8, 1921.   Serial No. 490,701.

(GRANTED UNDER THE PROVISIONS OF THE ACT OF MARCH 3, 1921, 41 STAT. L., 1313.)

*To all whom it may concern:*

Be it known that I, HUGO SCHWEITZER, citizen of the German Empire, residing at Leverkusen, near Cologne, Germany, have invented new and useful Improvements in Blue Wool Dyestuffs (for which I have filed applications in Germany, Feb. 19, 1916, Patent Number 298,432; Austria, Feb. 5, 1917, Patent Number 87,334; Switzerland, June 3, 1920, Patent Number 88,562, France, May 12, 1920, Patent Number 515,442; and in England, May 6, 1920, Patent Number 164,218), of which the following is a specification.

I have found that new and valuable azodyes can be obtained by combining diazo-compounds of 4-nitranilin-2-sulfamids having most probably the following general formula

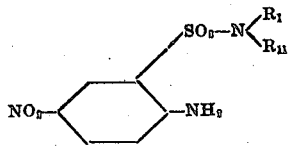

($R_1$ includes hydrogen and alkyl and aryl, such as —H, —$CH_3$, —$C_2H_5$; —$C_6H_5$ and $R_{11}$ stands for a hydrocarbon radicle e. g. —$CH_3$; —$C_2H_5$; —$C_6H_5$), with a 2-amino-8-naphthol-sulfonic acid compound, such as 2-amino-8-naphthol-6-sulfonic acid, 2-methylamino-8-naphthol-6-sulfonic acid. The copulation is carried out in an acid solution that the diazo group enters the naphtalene nucleus in ortho-position to the amino-group.

My new dyes in the form of their dried and pulverized salts with alkali metals are dark powders soluble in water generally with a bluish and in concentrated sulfuric acid with a red coloration. Upon reduction with tin and hydrochlorid acid a para-phenylendiamin derivative having most probably the formula:

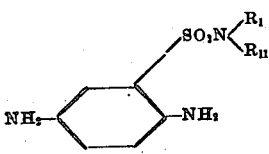

and a 1.2-diamino-8-naphtholsulfonic acid compound are obtained. They dye wool from acid baths even blue shades fast to light and fulling.

In order to illustrate the new process more fully the following example is given, the parts being by weight:—321 parts of 4-nitranilin-2-sulfethylanilid are dissolved in 300 parts of glacial acetic acid and are diazotized with 110 parts of hydrochloric acid and 69 parts of sodium nitrite. The diazo solution is then added to a solution of 239 parts of 2-amino-8-naphthol-6-sulfonic acid containing a slight excess of hydrochloric acid. The dye is salted out, treated with sodium carbonate, filtered off and dried.

It has in a free state most probably the formula:

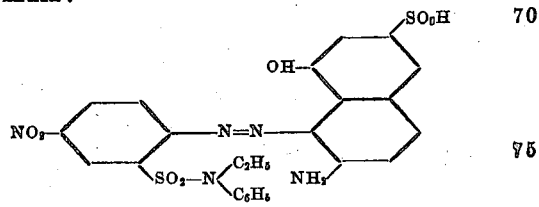

It is in the form of its sodium salt after being dried and pulverized a dark powder soluble in concentrated sulfuric acid with a red coloration. Upon treating it with tin and hydrochloric acid it is split up into 1.4-diaminobenzene-2-ethylphenylsulfamid and 1.2-diamino-8-naphthol-6-sulfonic acid. It dyes wool from acid bath navy-blue shades fast to light and fulling. Other of the above mentioned 4-nitranilinsulfamids can be used, such as 4-nitranilin-2-sulfanilid, 4-nitranilin-2-sulfdiphenylamid, 4-nitranilin-2-sulfmethylanilid or 4-nitranilin-2-sulfdimethylamid.

I claim:—

1. The herein described new azodyes, which in the form of their dried and pulverized salts with alkali metals are dark powders soluble in water generally with a bluish and in concentrated sulfuric acid with a red coloration; yielding upon reduction with tin and hydrochloric acid a substituted para-phenylenediaminsulfamid and a 1.2-diamino-8-naphtholsulfonic acid compound; and dyeing wool blue shades fast to light and fulling, substantially as described.

2. The herein described new azodye having in a free state most probably the following formula:

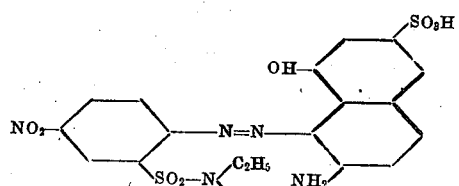

being in the form of its dried and pulverized sodium salt a dark powder soluble in concentrated sulfuric acid with a red coloration; yielding upon reduction with tin and hydrochloric acid 1.4-diamino-benzene-2-ethylphenylsulfamid and 1.2-diamino-8-naphthol-6-sulfonic acid; and dyeing wool from acid baths navy-blue shades fast to light and fulling, substantially as described.

In testimony whereof I have hereunto set my hand in the presence of two subscribing witnesses.

HUGO SCHWEITZER.

Witnesses:
 HELEN NUFER,
 FRANCES NUFER.